March 29, 1966  B. PERKINS, JR  3,243,772
VERTICAL DISPLACEMENT METER
Filed July 31, 1963
Fig. 1.
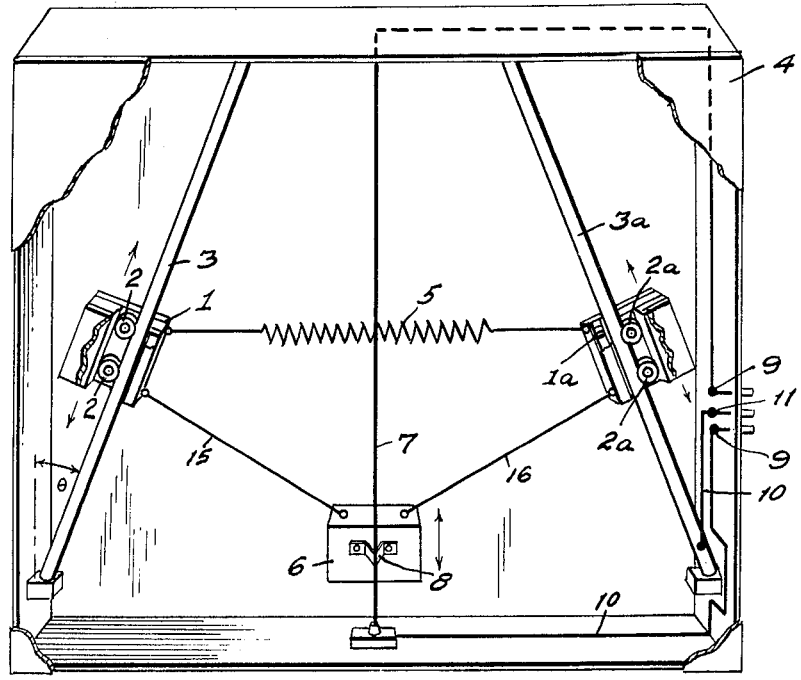
Fig. 3.
Fig. 2.
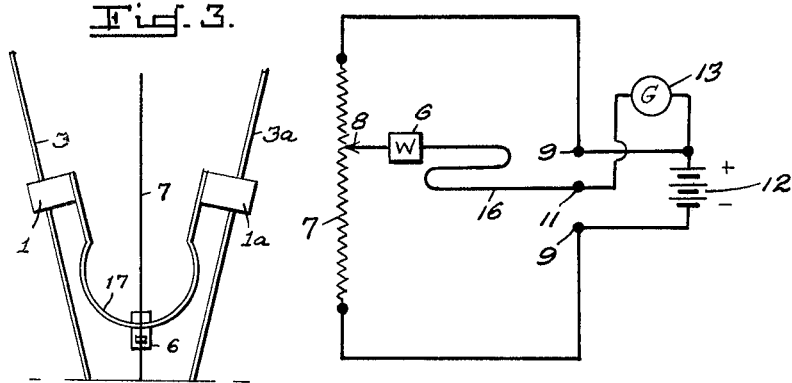
INVENTOR.
Beauregard Perkins, Jr.
BY Harry M. Saragovitz,
Edward J. Kelly & Herbert Berl

3,243,772
VERTICAL DISPLACEMENT METER

Beauregard Perkins, Jr., Aberdeen, Md., assignor to the United States of America as represented by the Secretary of the Army
Filed July 31, 1963, Ser. No. 299,129
5 Claims. (Cl. 340—17)

The invention described herein may be manufactured and used by or for the Government for governmental purposes without the payment to me of any royalty thereon.

This invention relates to measuring devices and more particularly to a vertical displacement meter adapted to be buried in the ground.

In the study of the phenomena associated with large explosions, earthquakes and the like, the vertical movement of the earth near the explosion has escaped accurate measurement primarily due to the nonexistence of an adequate measuring means. This problem is increased, due to its nature, since, in order to measure the vertical ground displacement associated with explosions the meter must be adapted to withstand the destructive forces of the explosion.

It is therefore, a primary object of the present invention to provide a device capable of measuring the transient vertical displacement of the earth in close proximity to a large explosion.

Another object of this invention is to provide a durable instrument adapted to measure the vertical movement of the ground near the epi-center of an earthquake.

A still further object is to provide a rugged vertical displacement meter which is simple of construction yet having a high degree of accuracy.

With these and objects in view which will become fully apparent as the specification develops, reference is made to the appended drawing forming a part of the specification and wherein:

FIG. 1 is a perspective view of the vertical displacement meter, the cover of the case being broken away to expose its mechanism, FIG. 2 illustrates the electrical circuit of the vertical displacement meter, and, FIG. 3 is a fragmentary view showing a modified form of meter.

Referring now in greater detail to the drawings, wherein like reference characters designate like or corresponding parts throughout the several views, there is shown in FIG. 1, a pair of slidable blocks 1 and 1a, each block being provided with a pair of rollers 2 and 2a respectively. Blocks 1 and 1a are slidable on diverging tracks 3 and 3a by rollers 2 and 2a. Tracks 3 and 3a lie in a vertical plane and are secured to the top and side walls of case 4 as shown in FIG. 1. An upward force is applied to blocks 1 and 1a by a spring 5 which is attached at each of its ends to one of the blocks 1 and 1a. The upward force is counteracted by a downward force exerted thereon by a weight 6 which is supported from blocks 1 and 1a by cords 15 and 16, as shown in FIG. 1.

A slide wire 7 is secured at each of its ends to the top and bottom walls of case 4 and is disposed vertically and medially therein, and a contact secured on weight 6 makes continuous sliding, electrical contact with the wire 7 which is connected to terminals 9 at its ends thereof. A lead 10 connects track 3a with a terminal 11. To complete the electric circuit between contact 8 and lead 10, track 3a, rollers 2 and 2a, block 1a and cord 16 are made of suitable electrically conductive material.

The electrical circuit of the vertical displacement meter is shown in FIG. 2, and includes a voltage source 12 and a galvanometer 13. The voltage source 12 and galvanometer are detachable connected to terminals 9 and 11 by suitable means (not shown) for their removal when desired.

The magnitude of weight 6 and tension of spring 5 are predetermined so that rollers 2, 2a will be in a position of equilibrium midway between the ends of tracks 3, 3a. The period of oscillation of the mechanism is determined by the angle of divergence $\theta$ (see FIG. 1).

Since the slide wire 7 is stationary, the position of weight 6 during oscillation with respect to its position of equilibrium is accurately reflected by the magnitude of the current through galvanometer 13.

In FIG. 3, there is shown a variation of the vertical displacement meter in which an expanding spring 17 is used instead of the type of spring shown at 5 in FIG. 1. In this view, the tracks 3 and 3a assume a converging instead of a diverging direction towards the bottom.

Operation

The meter is buried in the ground at an arbitrary distance from an explosive source. The galvanometer 13 and voltage source 12 may be located at an expedient distance from the meter by leads (not shown) connected to terminals 9 and 11. Upon detonation of the explosive charge (or earthquake) any vertical movement of the ground in which the meter is buried will force the case 4 upward also. Since the period of vertical movement of the earth would be short compared to that of the weight 6, the inertia of the weight would cause it to remain practically stationary for a short period of time. During this time interval, the relative motion between the weight 6 and case 4 can be accurately recorded by galvanometer 13.

For continuous use of the meter, as for example, to record a continuing series of explosions or earthquake tremors, case 4 could be supported by a gimbal (not shown) housed in an outer case which would allow the case 4 to automatically assume a vertical position and be ready for recording succeeding explosions or tremors. When used with a gimbal, a damping means (not shown) would be necessary to eliminate horizontal oscillations of the mechanism. The motion of weight 6 could also be damped. Such an arrangement is shown in a copending application by the inventor and assigned to the U.S. Government, Serial No. 72,812, now Patent No. 3,164,983, and filed Nov. 30, 1960 for "Horizontal Displacement Meter."

It is to be further understood that various modifications and embodiments of the invention are contemplated and may be obviously resorted to by those skilled in the art without departing from the spirit of the invention.

What is claimed is:

1. An apparatus for measuring vertical displacement comprising,
    (a) a vertical case,
    (b) a vertical slide wire mounted in said case for vertical movement therewith,
    (c) a contact piece in longitudinal slidable connection with said slide wire,
    (d) an inertia mass movably supported in said case and adapted to remain momentarily relatively stationary with respect to said case upon sudden vertical movements of said case,
    (e) said contact being supported by said inertia mass,
    (f) means for suspending said inertia mass in said case and including a pair of upwardly converging tracks supported adjacent the base of said case and a pair of blocks, each having a pair of rollers thereon and riding, one pair each, on a said track, said inertia mass being suspended from said blocks, and,
    (g) indicator means to indicate the magnitude of the vertical movements of said case, said means being responsive to relative movement of said contact on said slide wire.

2. An apparatus as in claim 1 and wherein said rollers are interconnected by a longitudinally extensible spring means.

3. An apparatus as in claim 1 and wherein said tracks, said blocks and said rollers are of electrically conductive material to complete an electrical circuit from said contact piece to said indicator means.

4. An apparatus as in claim 1 and wherein said inertia suspension means includes an elastically extensible member.

5. An apparatus as in claim 1 and wherein said inertia suspension means is electrically conductive to complete an electric circuit from said contact piece to said indicator means.

References Cited by the Examiner
UNITED STATES PATENTS

| | | | |
|---|---|---|---|
| 1,539,266 | 5/1925 | Mountford | 338—176 |
| 2,250,959 | 7/1941 | Kelly | 201—55 |
| 2,343,425 | 3/1944 | Smith | 201—62 |
| 2,681,442 | 6/1954 | Schurman | 340—17 |

BENJAMIN A. BORCHELT, *Primary Examiner.*

P. A. SHANLEY, *Assistant Examiner.*